United States Patent [19]

De Panafieu et al.

[11] 3,848,898
[45] Nov. 19, 1974

[54] CONNECTOR FOR USE BETWEEN AN UNDERWATER WELLHEAD AND A BEARING SURFACE

[76] Inventors: Philippe De Panafieu, Holland Pk. W11, London, England; Edward Earl Castor, P.O. Box 9163, Houston, Tex. 77011

[22] Filed: Apr. 9, 1973

[21] Appl. No.: 349,582

[30] Foreign Application Priority Data
Apr. 7, 1972 France .................... 72.12238

[52] U.S. Cl. ............... 285/61, 285/133 A, 285/145, 285/317
[51] Int. Cl. ................................ F16l 3/02
[58] Field of Search ...... 285/61, 133 A, 133 R, 143, 285/145, 317, 142, 140, 24, 144, 146, 147, 148, DIG. 21, 137 A; 166/88, 89

[56] References Cited
UNITED STATES PATENTS

| | | | |
|---|---|---|---|
| 2,591,142 | 4/1952 | Eckel | 285/142 |
| 2,599,039 | 6/1952 | Baker | 285/142 X |
| 3,311,168 | 3/1967 | Pierce, Jr. | 285/133 A X |
| 3,438,653 | 4/1969 | Fowler | 285/143 X |
| 3,472,535 | 10/1969 | Kinley | 285/145 |

*Primary Examiner*—James R. Boler
*Assistant Examiner*—Moshe I. Cohen
*Attorney, Agent, or Firm*—Sughrue, Rothwell, Mion, Zinn & Macpeak

[57] ABSTRACT

A connector intended to ensure a rigid attachment of a support to an underwater wellhead. The connector 1 rests on the conductor casing 5 and is locked in position by oblique dowels 10. In addition, the conically tapered sleeve 14 and the cooperating toothed wedges 15 further prevent any vertical movement of the connector. Leak sealing with respect to the support 19 is ensured by the seals 18, and with respect to the wellhead is ensured by the seals 7, 9, 22 and 23.

8 Claims, 1 Drawing Figure

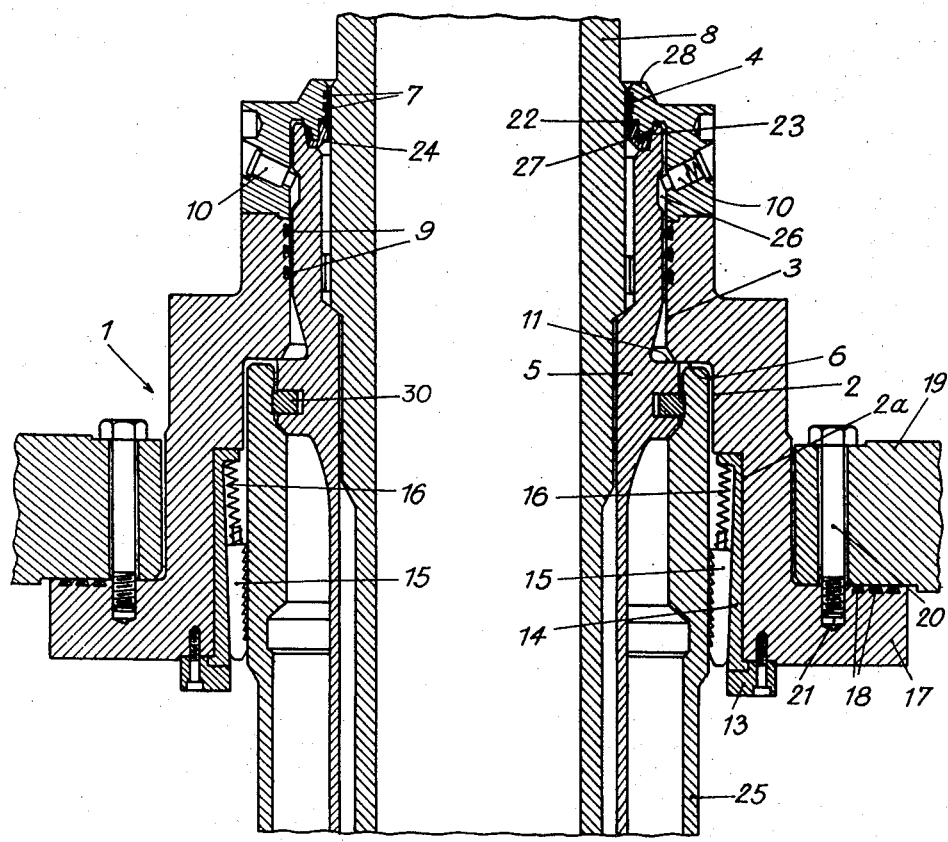

CONNECTOR FOR USE BETWEEN AN UNDERWATER WELLHEAD AND A BEARING SURFACE

The invention refers to a connector intended to ensure mainly a rigid attachment of a support to an underwater wellhead and to ensure leak-tightness between outer casing walls of the underwater head and of the support attached to the connector.

Many underwater connectors are known which ensure rigid attachment to and leak-tightness of an underwater wellhead. However, such connectors ensuring rigid connection with the casing head bring about a transfer of bending and twisting forces at the end of the casing head which become dangerous as soon as the torques resulting from the application of loads of several tens of tons exceed a certain threshold. Such cases can occur particularly as a result of impacts in the course of installation of the production tree, for example. The present invention provides a connector which can be lowered from a surface support by a remote-controlled manipulator, and which engages with and locks itself mechanically round a wellhead with only the weight of the connector being employed to actuate the locking or leak-sealing members. The connector is composed of a tubular body with cylindrical sections narrowing from the bottom upwards so as to follow the external shape of an underwater wellhead, and with at least one annular horizontal surface perpendicular to these cylindrical surfaces and resting on a carrier casing or casings, a locking device for keeping the connector in this position, a clamping device with wedges fixing the connector firmly to a conductor string of greatest diameter, and a leak-sealing device bearing on the external profile of the head.

A first advantage of the connector which is the object of the invention is to permit it to be firmly fixed to the conductor casings by bearing, locking and clamping devices, so that any movement of the connector relative to surface casings is excluded.

A second advantage is to free a sufficient height of the casing head, because of the small possible thickness of the upper portion of the connector, so enabling installation or exchange of production piping and associated well foot equipment.

Another embodiment of the invention provides a connector of this type in which inner cylindrical surfaces have leak-seal joints which come to bear and are compressed against the outer walls of the casing heads, the connector itself being provided with a flange on which a support plate has been fixed, for example, before lowering, in a rigid and leak-tight manner.

It is therefore possible to employ a connector of this type to produce a leak-tight base surrounding an underwater wellhead. It goes without saying there can likewise be connected to the flange of the connector a simple guide structure which is not leak-tight, serving solely as points of support, adjustment and guidance for any gathering pipework, hydraulic lines or electric power and telecommunication cables, this structure including also the adapters, ferrules and connection flanges for these gathering pipes, lines and cables.

Another embodiment of the invention provides a connector of the type defined above in which the means of locking onto the profile of the wellhead is composed of a horizontal surface bearing on the shoulder of the inner conductor casing by means of spring-loaded dowels engaging in a peripheral recess in the same conductor casing, and in which the clamping means round the outer conductor casing is a device with wedges provided with ribs in contact with the said casing, each wedge being spring-loaded so that the simple engagement of the connector round the wellhead enables it to sink to the locked position by the weight of the connector itself and the structures attached to it.

Thus it becomes possible by simple lowering of the connector and the structures attached to it from any sort of surface support, to ensure its engagement, locking and leak-tightening under the action simply of the weight of the connector and these structures.

Other advantages and characteristics will be apparent from the following description made in reference to the attached drawing which shows by way of non-restrictive example an embodiment of the connector.

In the drawing:

FIG. 1 shows an axial section of the connector in the locked position.

The tubular body 1 comprises an inner wall formed of a number of cylindrical surfaces such as 2, 3 and 4, the diameters of their sections perpendicular to the axis of the well decreasing from the surface 2 to the surface 4 in order to follow the contours of the wellhead with concentric casings of decreasing diameter.

The body 1 rests on the shoulder 11 of the conductor casing 5 by the horizontal annular surface 6.

The transfer downwards of the point of application 6 of the body 1 onto the shoulder 11 of the casing 5 thus enables the thickness of the upper portion 28 capping the end of the head of the conductor casing 5 to be reduced and the end of the production casing 8 to be left as clear as possible.

The surface 3 includes toroidal seals 9 which are applied against the periphery of the casing 5.

A series of dowels 10 distributed in cylindrical seats on oblique axes lock the body 1 in the position shown, by their tips entering the groove 26 in the casing 5. The seating of the dowels has the effect of preventing any movement of the connector upwards relative to the casing 5.

The seatinof the dowels is effected by convenient means (not shown). According to the preferred embodiment, however, the dowels are mounted on springs so that the dowels thus loaded by the springs engage of their own accord in the recesses 26.

At the periphery of surface 2a is a retainer ring 13 for the mounting of a taper-piece 14, a series of wedges 15 sliding on the conical surface of the taper-piece 14 under the thrust of the springs 16. As the taper-piece 14 converges downwards it is clear that each wedge will sink as low as the space available between the casing 25 and the taper-piece 14 will allow. In this way any vertical upwards movement or any rotational movement of the connector relative to the casing is countered. The portions of the wedges in contact with the outer casing 25 have ribs contributing to the prevention of any sliding upwards or in rotation.

As the concentricity of the cylinder 2 and the outer conductor casing 25 cannot be perfect because of the imperfect concentricity of the casings 25, 5 and 8, the independence of the wedges 15 relative to one another ensures their maximum sinking into the space formed between the taper-piece 14 and the casing 25. Thus wedging of the bottom of the connector is obtained onto the whole periphery of the casing 25.

Leak-sealing of the annulus between the casings 5 and 8 is obtained by means of a set of elastomer seals 22, 23 which are compressed during the engagement of the collar 27 located at the upper portion of the connector against the respective walls of the casings 8 and 5. A ring 24 sliding below the collar 27 makes contact with the upper surface of the casing 5 before the connector 1 rests on the shoulder 11. Thus the last few millimetres of travel of the connector during engagement compress the seals 22 and 23 against their corresponding bearing surfaces. Toroidal seals 7 are added in the grooves in the surface 4 in order to obtain positive leak-sealing between this portion of the connector and the casing 8.

The succession of seals 9, 23, 22 and 7 thus ensure perfect leak-tightness between the spaces located above and below the connector. A sealing ring 30 is also provided between the casings 5 and 25.

In the example shown a flange 17 at the bottom of the connector 1 has in its upper portion a series of grooves in which are inserted seals 18. A counterflange 19 is held against the flange 17 by means of bolts 20 screwed into blind holes 21 in the flange 17. The counterflange 19 which can include any required structure has therefore only been shown partially.

Similarly the members located inside the casing head 8 which form no part of the invention have not been shown. It will be noted further that the connector 1 by virtue of its conception still enables sufficient room to be made available for the installation of any kind of production tree or any kind of plug on the casing head.

It is clear that many changes can be applied to the various members shown and that in particular the attachment of the counterflange can be achieved by any known mechanical means.

What we claim is:

1. A connector assembly for joining pipe casings in an underwater wellhead, comprising:
   a. a generally cylindrical inner casing,
   b. a generally cylindrical intermediate casing concentric with and surrounding the inner casing over part of the length thereof,
   c. a generally cylindrical outer casing concentric with and surrounding the intermediate casing over part of the length thereof, means on the inner, intermediate, and outer casings forming a nested assembly of said casings, said nested assembly presenting, in cross-section, two inwardly oriented steps, one above the other, defined by the tops of the intermediate and outer casings, respectively,
   d. a tubular body having upper and lower generally cylindrical inner surface enlargements defining a cross-section profile generally conforming to the cross-section of the assembled inner, intermediate, and outer casings, the upper enlargement having a smaller diameter than the lower enlargement,
   e. an annular support surface on the intermediate casing defined by an annular step located at a height at least as great as the height of the outer casing,
   f. an annular bearing surface on the tubular body defined by a perpendicular step between the upper and lower enlargements and engaging the support surface,
   g. extendable locking means mounted in the tubular body adjacent and extending into the upper enlargement,
   h. means in the intermediate casing for receiving the locking means, whereby the tubular body is secured to the intermediate casing, and
   i. wedging means secured to the tubular body within the lower enlargement and engaging the outer casing whereby the tubular body is clamped to the outer casing.

2. A connector assembly according to claim 1, wherein the upper portion of the tubular body includes seals engaging the outer wall of the inner casing against which the tubular body bears.

3. A connector assembly according to claim 1 further comprising an outwardly extending connection flange integral with the tubular body, and mechanical connection means securing the flange to a support structure.

4. A connector assembly according to claim 3, further comprising leak-sealing means disposed between the flange and the support structure.

5. A connector assembly according to claim 1, wherein the locking means comprises a plurality of spring biased dowels adapted to enter recesses in the intermediate casing, the recesses comprising the receiving means.

6. A connector assembly according to claim 1, wherein the wedging means comprises a plurality of wedges, each wedge being loaded by a spring and having a ribbed surface engaging the outer wall of the outer casing.

7. A connector assembly according to claim 1, wherein the tubular body includes, at its upper end adjacent the top of the upper enlargement, a first lateral seal cooperating with the outer wall of the inner casing and a second lateral seal cooperating with an inner portion of the top of the intermediate casing, and further comprising a ring adjacent to these seals compressing them when the tubular body rests on the intermediate casing.

8. A connector assembly according to claim 7, wherein the upper end of the tubular body caps the top of the intermediate casing.

* * * * *